United States Patent [19]
Bolen

[11] 4,370,901
[45] Feb. 1, 1983

[54] CONNECTING ROD WITH VARIABLE LENGTH

[75] Inventor: Ralph A. Bolen, London, Ohio

[73] Assignee: John Sawyer, Cincinnati, Ohio

[21] Appl. No.: 222,327

[22] Filed: Jan. 5, 1981

[51] Int. Cl.³ .......................... G05G 3/00; F02B 75/04
[52] U.S. Cl. ........................................ 74/586; 74/44; 91/352; 123/48 B; 123/78 E
[58] Field of Search .................... 74/586, 88, 44; 123/48 B, 78 E; 91/39, 40, 352

[56] References Cited

U.S. PATENT DOCUMENTS

| | | | |
|---|---|---|---|
| 1,387,468 | 8/1921 | Chambless | 91/352 |
| 1,406,886 | 2/1922 | Nuta | 123/78 E |
| 2,134,995 | 11/1938 | Anderson | 74/586 X |
| 4,124,002 | 11/1978 | Crise | 123/78 E |
| 4,140,091 | 2/1979 | Showers | 123/78 E |
| 4,195,601 | 4/1980 | Crise | 123/48 B X |

*Primary Examiner*—Ernest R. Purser
*Attorney, Agent, or Firm*—James D. Liles

[57] ABSTRACT

A connecting rod, especially useful as a piston rod, is bifurcated into two relatively moving components which permit the rod to elongate and contract under the influence of pressure which is selectively directed into one of two variable volume parts while being exhausted from the other. The fluid which is directed into and exhausted out of the variable volume chambers is controlled as a function of the angular displacement of the connecting rod relative to a driving shaft.

21 Claims, 6 Drawing Figures

CONNECTING ROD WITH VARIABLE LENGTH

BACKGROUND

The present invention relates to connecting rods and more particularly concerns a connecting rod of variable length. It will be specifically disclosed, for purposes of illustration, in connection with a piston rod for an internal combustion engine. However, the invention has potential utility in virtually any application which uses, or could use, a variable length connecting member. It is particularly applicable for devices having a crankshaft and a piston.

Conventional pistons have generally included a piston rod which is used to reciprocally drive the piston back and forth within a cylinder. The piston rod has generally been rigid and of fixed predetermined length. Generally, the piston rod is itself driven by a rotating crankshaft to which the piston rod is rotatably attached through the agency of a two part connective housing.

Many times, the stroke of a piston within a cylinder is used to compress fluid within the cylinder or to perform other types of work. The amount of compression or work performed is, of course, a function of the length of piston stroke or travel within the cylinder. In the past, this length of piston travel has been dictated by the displacement of the crankshaft or other driving means for the piston rod. It has become apparent that increasing the stroke or length of travel of piston within the cylinder without the necessity of correspondingly increasing the displacement of the crankshaft or other driving means would offer great advantages.

One example of the advantages offered by so increasing the stroke of the piston within a cylinder is an internal combustion engine. Increasing the stroke of an internal combustion engine increases the operative volume of the cylinder. The cylinder will be able to take in a greater amount of air and fuel during the intake stroke of the piston with an increase in the compression during the compression stroke.

Accordingly, it is an object of the present invention to increase the stroke of a piston within a cylinder without the necessity of increasing the displacement of a crankshaft or other driving means for the piston rod.

It is a further object of the present invention to increase the horsepower of an internal combustion engine.

It is yet another object of the present invention to provide a piston of variable length which is extendable and contractable under the impetus of fluid pressure.

It is still another object of the present invention to provide an extendable connecting rod with a length which varies with the relative angular displacement of the rod about a shaft.

SUMMARY OF THE INVENTION

In accordance with the invention, an extendable piston rod is provided. The piston rod includes a housing which is rotatably attachable to a crankshaft. A two-part connecting rod includes a first portion which is rigidly attached to the housing and a second portion which is movably interconnected to the first portion. A first variable volume chamber is interposed between the first and second portions of the connecting rod with one end of the first variable volume chamber being rigidly affixed to the first portion of the rod. The other end of the first variable volume chamber is rigidly affixed to the second portion of the rod but is movably interconnected to the first portion. The first variable volume chamber has an increasing volume as the second portion of the piston rod is moved relative to the first portion in a predetermined direction and a decreasing volume when the second portion of the rod is moved in a direction opposite the predetermined direction. A second variable volume chamber is also interposed between the first and second portions of the rod with one end of the second variable volume chamber being rigidly affixed to the first portion of the rod. The other end of the second variable volume chamber is rigidly affixed to the second portion and movably interconnected to the first. The second variable volume chamber has an increasing volume as the second portion of the rod is moved relative to the first portion in a direction opposite the predetermined direction and has a decreasing volume as the second portion is moved relative to the first portion in the predetermined direction. Means are also provided for alternately establishing fluid communication between each of the variable volume chambers and a pressurized fluid source while simultaneously providing fluid communication between the other of the variable volume chambers and in fluid exhaust. The fluid communication with each of the variable volume chambers is established in accordance to the angular position of the housing relative to a crankshaft.

In accordance with another aspect of the invention, one of the connecting rod portions has a way system upon which the other portion of the piston is movable in the predetermined direction and in a direction opposite the predetermined direction. The variable volume chambers are formed by matching recesses in the first and second portions and are preferably formed by dividing a common chamber with a divider.

In a specific aspect of the invention, the way system is formed by dovetail tongues on one of the connecting rod portions with mating dovetail recesses in the other connecting rod portion. The shaft for driving the connecting rod in a further aspect of the invention has a pressurized fluid system with radial passageways leading to both a pressure fluid source and a fluid return line. These radial passageways preferably communicate through one of two circumferential ports in bearings, interposed between the shaft and housing, to the variable volume chambers by way of passages extending through the housing and at least one of the connecting rod portions. The ports in the bearings are aligned such that when one of the radial passages is in registry with one of the ports in the bearing, the other radial passage is in registry with the other port.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
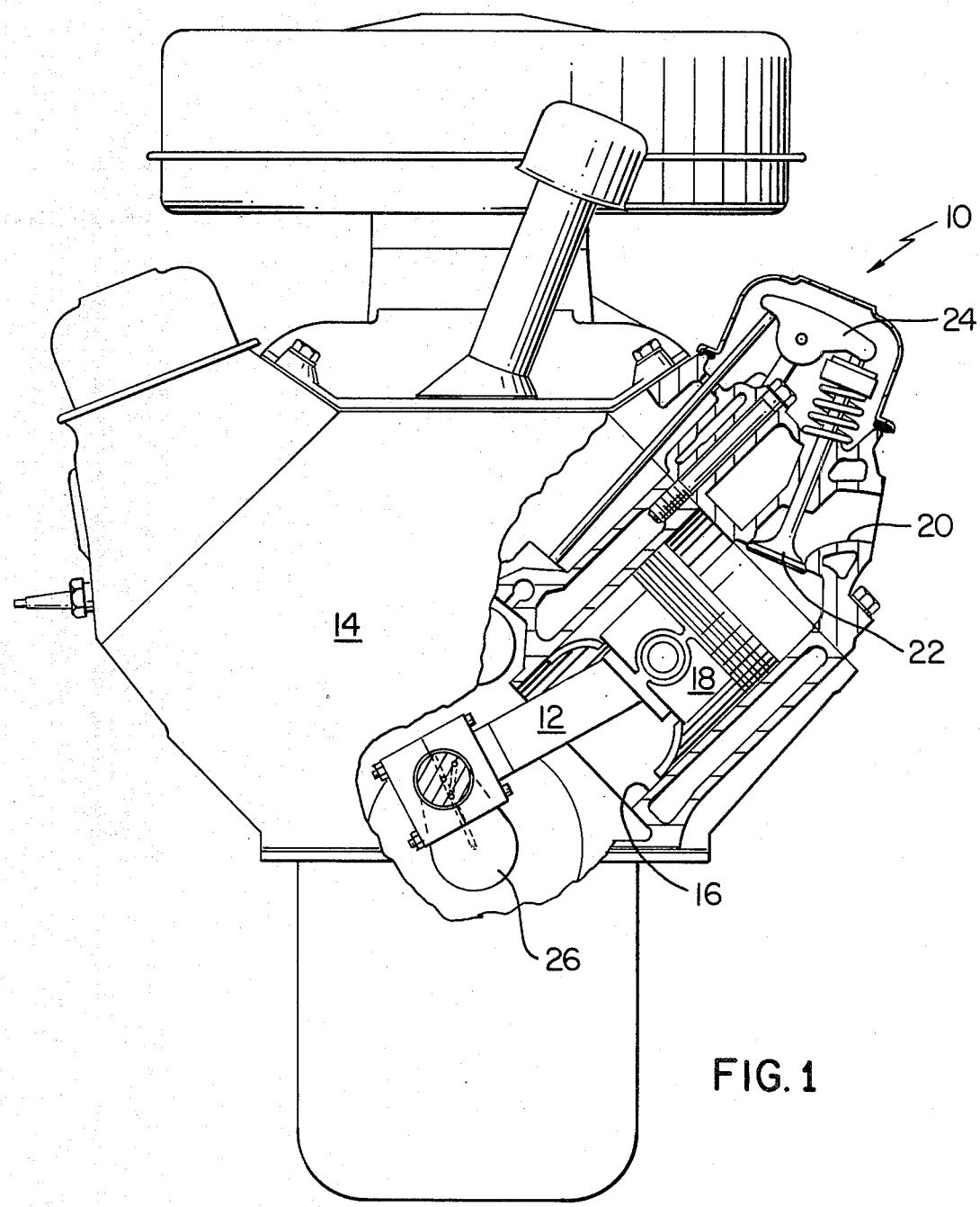
FIG. 1 is a fragmentary front elevational view of an internal combustion engine depicting the use of a novel extendable piston rod of the present invention.

Referring now to the drawings, FIG. 1 depicts an internal combustion engine 10 which includes an extendable piston rod 12 made in accordance to the instant invention. The internal combustion engine 10 has a block 14 having a cylinder 16 through which a piston 18 is reciprocally movable. As is conventional, the cylinder 16 is in selective fluid communication with intake (not shown) and exhaust passages 20 in accordance with the opening and closing of intake (not shown) and exhaust valves 22. The inlet (not shown) and exhaust valves 22 are opened and closed in timed relationship with the movement of the piston 18 through the agency of a rocker arm 24, both the rocker arm 24 and the piston 18 being interconnected to a rotating crankshaft 26 in a conventional manner. With the exception of the piston rod 12, which will be described later in greater detail, the illustrated internal combustion engine 10 is conventional in structure and operation. Accordingly, since the details of structure and operation of the internal combustion engine will be apparent to those skilled in the art and form no part of the present invention, per se, further description of the internal combustion engine will be limited in the interests of brevity to those details necessary to a full understanding of the improvements offered by the present invention.

Figure 2:
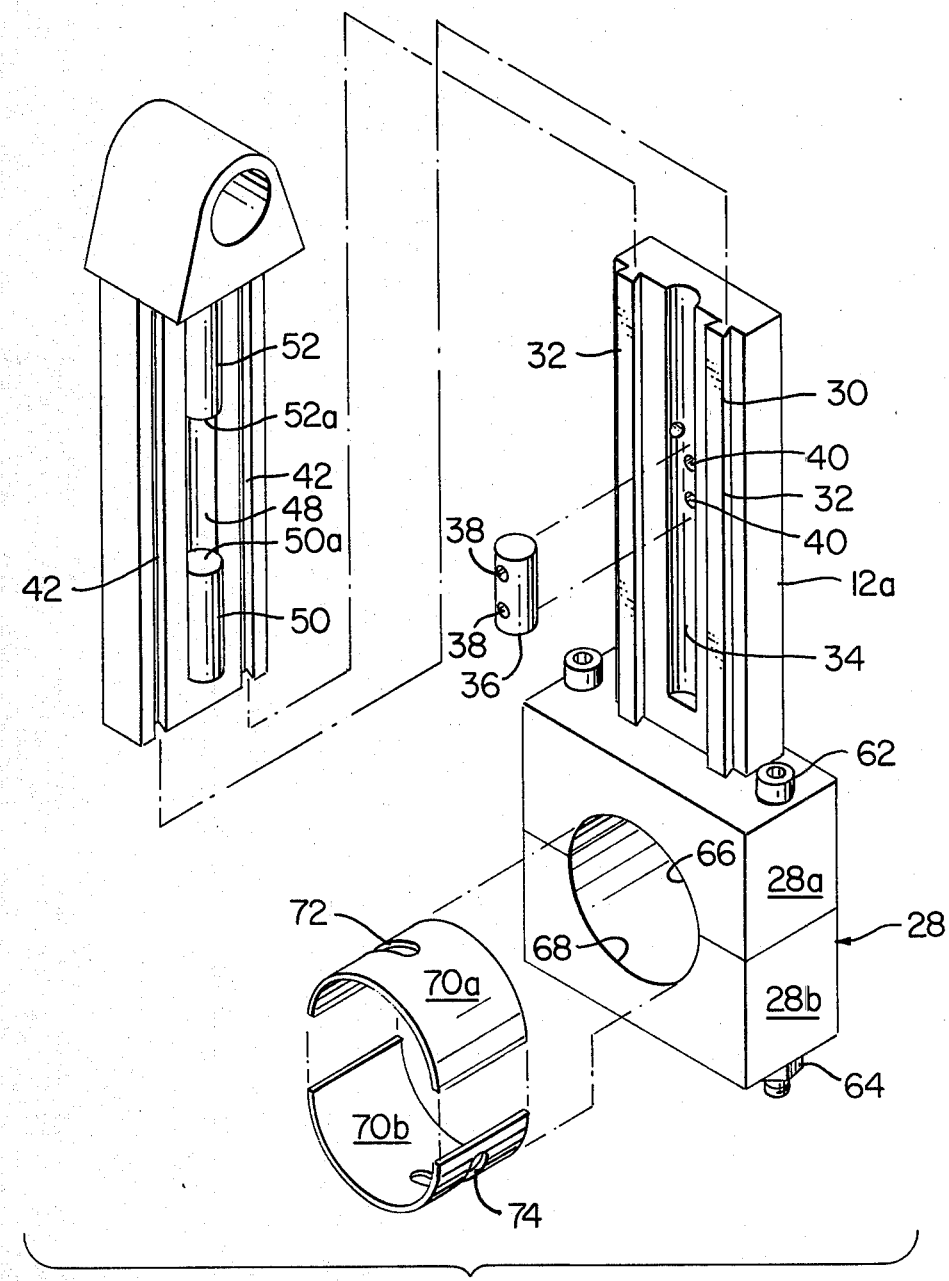
FIG. 2 is an exploded perspective view of the piston rod used in the embodiment of FIG. 1 depicting the manner in which the separate portions of the piston rod are interconnected.
Figure 3:
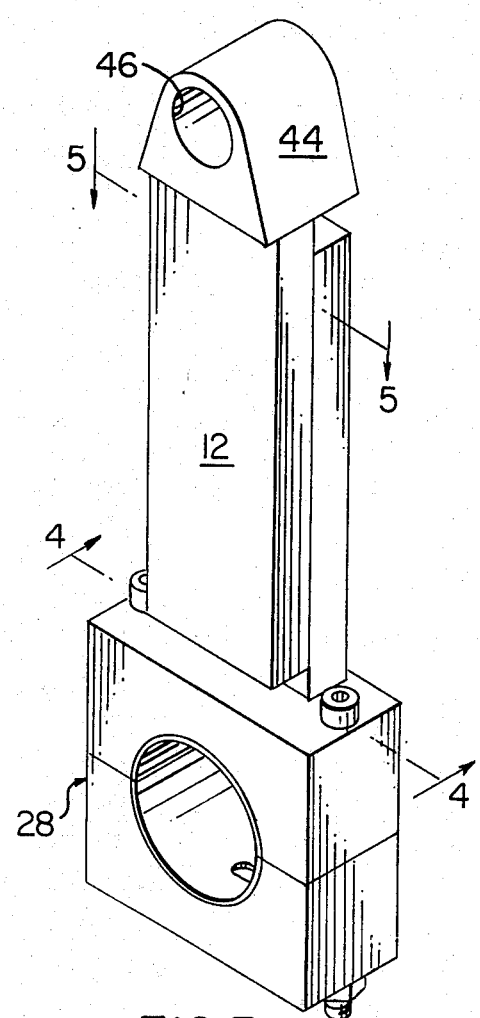
FIG. 3 is a perspective view of the piston rod of FIG. 2 depicting the two portions of the piston rod in assembled relationship.
Figure 4:
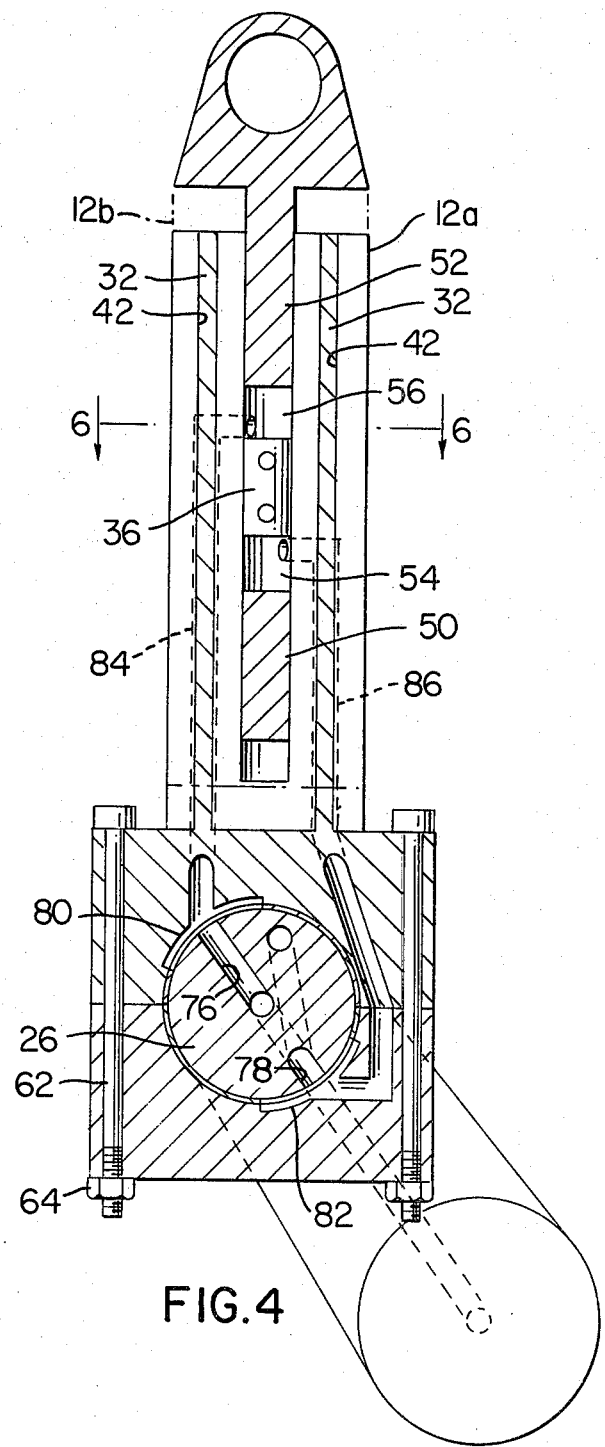
FIG. 4 is a cross-sectional elevational view of the piston rod of FIGS. 2 and 3.

As seen most clearly in FIGS. 2-4, the piston rod 12 is bifurcated or split into separate longitudinally movable portions. The first portion 12a of the piston rod is rigidly attached to a first half 28a of a divided housing 28. The first portion 28a has a longitudinally extending way system 30 in the form of dovetail tongues 32 which extend throughout the length of the first portion 12a of the piston rod 12. A semi-cylindrically shaped recess 34 is disposed between the two dovetail tongues 32 and extends for substantially the entire length of the first half or portion 12a of the rod 12. A cylindrically shaped divider 36 is fixedly secured to a central portion of the semi-cylindrically shaped recess 34 through appropriate fastening means, such as, for example, screws (not shown), which extend through apertures 38 in the divider 36. These apertures 38 in the divider 36 are in alignment with threaded apertures 40 in the recess 34. The threaded apertures 40 in the recess 34 receive the non-illustrated screws which pass through apertures 38 in the divider 36 to securely hold the divider 36 in the recess 34.

Figure 5:
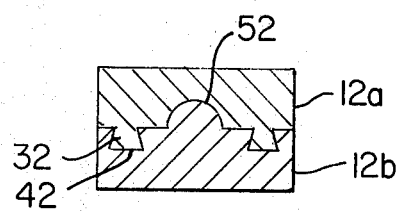
FIG. 5 is a cross-sectional view taken along line 5—5 of FIG. 3 depicting the assembled interrelationship of the separate piston rod components.
Figure 6:
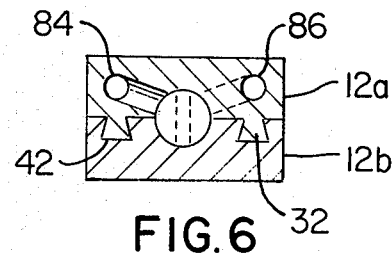
FIG. 6 is a cross sectional view taken along line 6—6 in FIG. 4 depicting a divider which separates a pair of variable volume chambers in the piston rod.

As realized most readily from a viewing of FIG. 2, a second half or portion 12b of the piston rod 12 is slidingly and reciprocally mounted with respect to the first portion 12a to longitudinally slide upon the way system 30 of the piston rod's first portion 12a. The second portion 12b of the piston rod 12 has a pair of grooves 42 which have a dovetail cross sectional configuration to matingly receive the tongues 32 on the rod's first portion 12a. These dovetail grooves 42 run substantially the entire longitudinal length of the second portion 12b in spaced parallel alignment with the dovetail tongues 32. FIGS. 5 and 6 show the manner in which the tongues 32 are slidingly interconnected to and slidingly received by the matched grooves 42. The rod's second portion 12b has an enlarged connecting portion 44 having an aperture 46. This aperture 46 receives a connecting pin (not shown) to rotatably connect the piston rod 12 to the piston 18 (FIG. 1).

A semi-cylindrical recess 48 (FIG. 2) lies between the two dovetail grooves 42. At the longitudinal ends of this semi-cylindrical recess 48, semi-cylindrically shaped block protrusions 50, 52 which protrude outwardly from the interior surface of the piston rod's second portion 12b. When the rod's two portions 12a and 12b are assembled with the dovetail grooves 42 receiving the dovetail tongues 32, the semi-cylindrically shaped protrusions 50 and 52 encompass virtually the entire semi-cylindrical recess 34 in the first portion 12a of the rod 12 along the protrusion's (50, 52) length, the radius of the semi-cylindrically shaped block protrusions 50 and 52 approximating the radius of the semi-cylindrical recess 34 and 48 in the rod portion 12a and 12b.

The semi-cylindrically shaped recess 48 between the cylindrically shaped block protrusions 50 and 52 of the rod's second portion 12b is greater in length than the length of the divider 36 in the first portion 12a. When assembled, the divider 36 is positioned in the space or recess 48 between the semi-cylindrically shaped block protrusions 50 and 52 and pressure chambers, a first pressure chamber 54 and a second pressure chamber, 56 are formed between the axial ends of the divider 36 and the inwardly disposed axial ends 50a and 52a of the semi-cylindrically shaped protrusions 50 and 52. The volume of these two pressure chambers 54 and 56 varies as the second portion of the rod 12b is moved relative to the first portion 12a. As will be explained more fully later, pressurized fluid is selectively ported into one of the other of these two variable volume chambers 54 or 56 to effectuate relative movement between the two portions 12a and 12b of the piston rod 12, forcing the rod 12 to elongate and retract.

As mentioned above, the first portion 12a of the piston rod 12 is rigidly attached to one half 28a of a two piece journal housing 28. A mating half 28b is secured to the first half 28a of the housing 28 by a pair of appropriate fastening elements, specifically illustrated as bolts 62 and nuts 64. The two journal housing halves 28a and 28b have aligned semi-cylindrical recesses 66 and 68 which jointly circumscribe the crankshaft 26, as shown in FIG. 4, to provide a rotatable connection between the journal housing 28 and the crankshaft 26.

A set of journal bearings 70, shown most clearly in the isolation depiction of FIG. 2, is interposed between the crankshaft 26 and the journal housing 28. These bearings 70 are conventional with the exception of the elongated circumferential openings or slots in the bearings 70, circumferential slot 72 extending through bearing 70a and circumferential slot 74 extending through bearing 70b.

In a typical internal combustion engine 10, such as that illustrated, pressurized lubricating oil is continuously directed through the crankshaft 26 by oil pump (not shown). The illustrated embodiment makes use of this feature in carrying out the invention by drilling a first radial passageway 76 (see FIG. 4) in the crankshaft 26 to provide fluid communication between the pressurized oil flowing interiorly within the crankshaft 26 and the crankshaft's exterior periphery. A second radial passageway 78 communicates between the oil return line disposed in the crankshaft's interior and the crankshaft's external periphery. These radial passageways 76 and 78 are aligned with the circumferential grooves or slots 72 and 74 in the bearings 70a and 70b, which grooves 72 and 74 are, in turn, positioned over circumferential oil galleys 80, 82 in the journal housing 28.

The first of the aforementioned oil galleys 80 is in fluid communication with the first variable volume chamber 56 by way of a fluid passage 84 (shown in phantom in FIG. 4) in the first portion 12a of the piston rod 12. The second oil galley 82 is, in turn, in fluid communication with the second variable volume chamber 54 in a similar manner through a fluid passageway 86 (also shown in phantom in FIG. 4).

As perhaps suggested from the description above, when the internal combustion engine 10 is operating, the crankshaft 26 is continuously rotated with respect to the journal housing 28. As a consequence of this rotation, the radial passageways 76 and 78 in the crankshaft 26, connecting the pressurized oil and return lines in the crankshaft, are in fluid communcation with the oil galleys 80 and 82 for a period which corresponds to the registry of the radial passageways 76 and 78 with the circumferential grooves 72 and 74 in the bearings 70a and 70b respectively. In the illustrated embodiment, the circumferential grooves 72 and 74 correspond in peripheral length to the peripheral length of the oil galleys 80 and 82, both of which extend on peripheral sides of the passageways 76 and 78 to increase the dwell time in which the radial passageways 76 and 78 are in fluid communication with the pressure and return lines of the crankshaft through the radial passageways 76 and 78. The degree of circumferential extension of the grooves 72 and 74 will be dependent upon the desired timing of the piston rod 12 and its extension. It may be desirable to circumferentially extend the grooves 72 and 74 one side or the passages 84 and 86 or the other or both, as in the illustrated embodiment. The length of the grooves' (72 and 74) extension as well as the positioning of radial passageways 76 and 78 may vary with the application. The timing requirements of an air compressor, for example, may differ from an engine. The timing requirements may vary with the type of engine, as, for example, two cycle, four cycle, diesel, natural gas, propane, aircraft, marine, automobile or stationary engine.

Whatever the application, it will most commonly be preferred to position the radial passageways 76 and 78 and to vary the extension of the circumferential grooves 72 and 74 so that extension of the rod 12 is accomplished with the least amount of resistance. In the illustrated embodiment, this condition would correspond to the timing which would expose the piston 18 to the lowest amount of differential pressure. The rod 12 would be extended at the beginning of the compression stroke and the exhaust stroke and retracted at the end of the firing stroke and intake stroke.

Operatively, the preciously described piston rod 12 is rotated about the crankshaft 26 as illustrated in FIG. 1 to effectuate reciprocal movement of the piston 18 within the cylinder 16. Supplemental to the reciprocal movement dictated by the rotation of the crankshaft 26, additional movement of the piston 18 is generated by the relative movement of the second portion 12b of the piston rod 12 with respect to the rod's first portion 12a. The relative movement of one portion of the piston rod 12 with respect to the other is achieved by utilizing the fluid power of the pressurized lubricating oil within the crankshaft 26.

As the crankshaft 26 is rotated with respect to the journal housing 28, the first radial passageway 76 is brought into registry with the circumferential slot 72 in the bearing 70a and the fluid pressure provided by the oil pump (not shown) is directed to the first variable volume chamber 56 by way of the oil galley 80 and the passageway 84. Simultaneously, the second radial passageway 78 is brought into registry with the other circumferential slot 74 to permit fluid in the second variable volume chamber 54 to exhaust into the return line of the crankshaft 76 oiling system. The introduction of pressurized fluid into the first variable volume chamber 56, coupled with the opportunity for fluid in the second variable volume chamber 54 to be exhausted, allows the first variable volume chamber 56 to expand as the pressure upon the interior axial and 52a of the semi-cylindrically shaped block protrusion 52 is urged longitudinally away from the divider 36. This moves the second portion 12b of the piston rod 12 with respect to the first portion 12a. As should be apparent, this action increases the length of the piston rod 12 and adds to the stroke of the piston 18 within the cylinder as the piston rod's 12 second portion 12b is slidingly moved upon the way system 30 of the first portion 12a.

As the crankshaft 26 continues to rotate with respect to the journal housing 28, the first radial passageway 76 is moved out of registry with the first circumferential slot 72 and the second radial passageway 78 is moved out of registry with the second circumferential slot 74 in the bearing 70, disrupting fluid communication between both the fluid pressure line and the first variable volume chamber 56 and the return line and the second variable volume chamber 54. The piston rod 12 will remain in the extended position previously achieved until further rotation of the crankshaft 26 with respect to the journal housing 28 brings the first radial passageway 76 into registry with the second circumferential slot 74 in the bearing 70b and the second radial passageway 78 into registry with the first circumferential slot 72. When this alignment occurs, the first variable volume chamber 56 is in fluid communication with the return line and the crankshaft and the second variable volume chamber 54 is in fluid communication with the fluid pressure line. This last mentioned arrangement introduces pressurized lubricating oil into the second variable volume chamber 54 against the interior axial end 50a of the cylindrically shaped block protrusion 50 to urge the portion 12b of the piston rod 12 into movement along the way system 30 of the piston rod's first portion 12a. As a result, the first variable volume chamber 56 is decreased in size while the volume of the second variable volume chamber is increased, retracting the previously extended piston rod 12. The fluid in the first variable volume chamber 56 is exhausted through the passageway 84 and the oil galley 80 into the return line upon rotation of the piston rod.

Thus, it is apparent that there has been provided, in accordance with the invention, an apparatus that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An extendable piston rod, comprising:
   (a) a housing, said housing being rotatably attachable to a crankshaft;
   (b) a connecting rod including:
      (i) a first portion rigidly attached to said housing; and
      (ii) a second portion movably interconnected to said first portion;
   (c) a first variable volume chamber interposed between said first and second portions of said rod, one end of said first variable volume chamber being rigidly affixed to said first portion of said rod and the other end being rigidly affixed to the second portion but movable relative to said first portion, said first variable volume chamber having an increasing volume as said second portion of said rod is moved relative to said first portion in a predetermined direction and a decreasing volume as said second portion of said rod is moved relative to said first portion in a direction opposite said predetermined direction;
   (d) a second variable volume chamber interposed between the first and second portions of said rod, one end of said second variable volume chamber being rigidly affixed to said first portion of said rod and the other end being rigidly affixed to said second portion but movable relative to said first portion, said second variable volume chamber having an increasing volume as said second portion of said rod is moved relative to said first portion in a direction opposite said predetermined direction and a decreasing volume as said second portion of said rod is moved relative to said first portion in said predetermined direction; and
   (e) means for alternately providing selective fluid communication between each of said variable volume chambers and a pressurized fluid source while simultaneously providing fluid communication between the other of said variable volume chambers and a fluid exhaust in accordance to the relative angular position of the housing to a crankshaft.

2. An extendable piston rod as recited in claim 1 wherein one of said first and second portions of said piston rod has a way system upon which the other portion of said piston rod is movable in said predetermined direction and in a direction opposite said predetermined direction.

3. An extendable piston rod as recited in claim 2 wherein said variable volume chambers are formed by matching recesses in said first and second portions of said piston rod.

4. An extendable piston rod as recited in claim 3 wherein said first and second variable volume chambers are formed by dividing a common chamber with a divider which is rigidly attached to the first portion of the rod.

5. An extendable piston rod as recited in claim 2 wherein said way system is formed by a pair of dovetail tongues on one of said first and second portions of said piston rod with matching dovetail recesses in the other of said piston rod portions, said tongue and matching recesses extending in said predetermined direction.

6. An extendable piston rod as recited in claim 5 wherein said dovetail tongues are formed upon said first portion of said piston rod.

7. An extendable piston rod as recited in claim 5 wherein said variable volume chambers are disposed between one mated dovetail tongue and mated dovetail recess and the other dovetail tongue and mated dovetail recess.

8. An extendable piston rod as recited in claim 2 wherein said fluid communication means includes fluid passages between said housing and said variable volume chambers.

9. An extendable piston rod as recited in claim 4 further including a crankshaft, said crankshaft being rotatably disposed within said housing.

10. An extendable piston rod as recited in claim 9 further including a bearing interposed between said crankshaft and said housing, said bearing having ports for providing fluid communication between said crankshaft and said fluid passages between said housing and said variable volume chambers.

11. An extendable piston rod as recited in claim 10 wherein said crankshaft has a pair of radially extending passages for fluid communication between a fluid power source and a fluid return line respectively, said ports in said bearing being aligned relative to said radial passages such that when one of said radial passages is in registry with one of said ports, the other of said radial passages is in registry with said other port, said ports and said radial passages being in fluid communication when in registry.

12. An extendable rod, comprising:
    (a) a shaft;
    (b) a housing, said shaft being rotatably disposed within said housing;
    (c) a bifurcated rod including:
       (i) a first portion rigidly attached to said housing; and
       (ii) a second portion movably interconnected to said first portion;
    (d) a first variable volume chamber interposed between said first and second portions of said rod, one end of said first variable volume chamber being rigidly affixed to said first portion of said rod and the other end being rigidly affixed to the second portion but movable relative to said first portion, said first variable volume chamber having an increasing volume as said second portion of said rod is moved relative to said first portion in a predetermined direction and a decreasing volume as said second portion of said rod is moved relative to said first portion in a direction opposite said predetermined direction;
    (e) a second variable volume chamber interposed between the first and second portions of said rod, one end of said second variable volume chamber being rigidly affixed to said first portion of said rod and the other end being rigidly affixed to said second portion but movable relative to said first portion, said second variable volume chamber having an increasing volume as said second portion of said rod is moved relative to said first portion in a direction opposite said predetermined direction and a decreasing volume as said second portion of said rod is moved relative to said first portion in said predetermined direction; and (f) means for alternately providing selective fluid communication between each of said variable volume chambers and a pressurized fluid source while simultaneously providing fluid communication between the other of said variable volume chambers and a fluid exhaust in accordance to the relative angular position of the housing to a shaft.

13. An extendable rod as recited in claim 12 wherein one of said first and second portions of said rod has a way system upon which the other portion of said rod is movable in said predetermined direction and in a direction opposite said predetermined direction.

14. An extendable rod as recited in claim 13 wherein said variable volume chambers are formed by matching recesses in said first and second portions of said rod.

15. An extendable rod as recited in claim 14 wherein said first and second variable volume chambers are formed by dividing a common chamber with a divider which is rigidly attached to the first portion of the rod.

16. An extendable rod as recited in claim 13 wherein said way system is formed by a pair of dovetail tongues on one of said first and second portions of said rod with matching dovetail recesses in the other of said piston rod portions, said tongue and matching recesses extending in said predetermined direction.

17. An extendable rod as recited in claim 16 wherein said dovetail tongues are formed upon said first portion of said rod.

18. An extendable rod as recited in claim 16 wherein said variable volume chambers are disposed between one mated dovetail tongue and mated dovetail recess and the other dovetail tongue and mated dovetail recess.

19. An extendable rod as recited in claim 13 wherein said fluid communication means includes fluid passages between said housing and said variable volume chambers.

20. An extendable rod as recited in claim 19 further including a bearing interposed between said shaft and said housing, said bearing having ports for providing fluid communication between said shaft and said fluid passages between said housing and said variable volume chambers.

21. An extendable rod as recited in claim 20 wherein said shaft has a pair of radially extending passages for fluid communication between a fluid power source and a fluid return line respectively, said ports in said bearing being aligned relative to said radial passages such that when one of said radial passages is in registry with one of said ports, the other of said radial passages is in registry with said other port, said ports and said radial passages being in fluid communication when in registry.

* * * * *